United States Patent Office 3,393,192
Patented July 16, 1968

3,393,192
NOVEL BENZAZEPINES
Lewis A. Walter, Madison, N.J., and Wei K. Chang, New York, N.Y., assignors to Schering Corporation, Bloomfield, N.J., a corporation of New Jersey
No Drawing. Filed Apr. 26, 1965, Ser. No. 451,063
9 Claims. (Cl. 260—239)

ABSTRACT OF THE DISCLOSURE

This invention relates to 2,3,4,5-tetrahydro-3,1-benzapine having a member of the group consisting of hydrogen, lower alkyl, hydroxy lower alkyl, lower alkenyl and benzyl attached to the 3-position nitrogen atom, and optionally being further substituted at each of the 1- and 4-positions with a methyl radical, said compounds being useful as anti-bacterials, anti-depressants, anti-hypertensivers and as analgesics. The compounds are prepared by the condensation of a phenethylaminomethylbenzyl alcohol, which when subjected to dehydration, cyclizes to the 3,1-benzazepine which, in turn, is N-alkylated to the desired product.

This invention relates to compositions of matter classified in the art of chemistry as being derivatives of 1-phenyl-2,3,4,5-tetrahydro-3,1-benzazepines, and to the processes for making and using such compositions.

The invention sought to be patented in its composition aspect is described as residing in the concept of a chemical compound having the molecular structure of a 1-phenyl-2,3,4,5-tetrahydro-3,1-benzazepine having an N-substituent selected from the group consisting of hydrogen, lower alkyl, hydroxy lower alkyl having 2-6 carbon atoms, lower alkenyl and benzyl, and optionally having a methyl substituent at either or both of the 1- and 4-positions thereof. Included within this concept are the pharmaceutically acceptable acid addition and quaternary salts thereof.

The invention sought to be patented in one of its process aspects is described as residing in those concepts which comprise the condensation of a phenethylamine with a styrene oxide to produce a phenethylaminomethylbenzyl alcohol which, upon dehydration undergoes an intramolecular cyclization to form the appropriate 3,1-benzazepine which, in turn, optionally may be subjected to direct alkylation procedures to produce the N-substituted benzazepines.

The invention sought to be patented in another one of its process aspects resides in the concept of condensing a phenethylamine with a mandellic acid ester to produce an N-(β-phenethyl)-mandelamide which upon dehydration undergoes an intramolecular cyclization to produce a 1-phenyl-2-oxo-3,1-benzazepine which optionally may be subjected to direct alkylation procedures to produce the 1-phenyl-2-oxo-3-substituted benzazepine intermediates, which are chemically reduced to the desired 2,3,4,5-tetrahydro-3,1-benzazepine.

The tangible embodiments of the invention, in the form of the free base or acid addition and quaternary salts thereof possess the inherent applied use characteristic of exerting anti-bacterial effects, central nervous system effects in that they exert anti-depressant and analgesic effects, and are also active in the cardiovascular system in that they exert a hypotensive effect, and therefore as such are therapeutically useful.

More specifically, the tangible embodiments of this invention are chemical compounds having the structural formula:

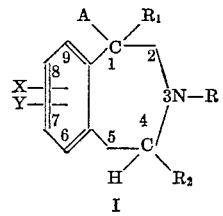

I and the non-toxic acid addition and quaternary salts thereof, wherein each of X and Y are individually selected from the group consisting of hydrogen, lower alkyl, lower alkoxy, halogen, hydroxy, and taken together, alkylene dioxy having up to 3 carbon atoms, a is a member of the group consisting of phenyl and halogeno-, lower alkoxy- and lower alkyl- substituted phenyl, R represents a member of the group consisting of hydrogen, lower alkenyl, lower alkyl, hydroxy lower alkyl having 2–6 carbon atoms, and benzoyl, and each of $R_1$ and $R_2$ are selected from the group consisting of hydrogen and methyl.

The lower alkyl substituents include such monovalent radicals as ethyl, propyl, butyl and such other straight and branched-chain aliphatic hydrocarbon residues having 1–6 carbon atoms, but preferably methyl; the hydroxy lower alkyl having 2–6 carbon atom substituents include hydroxy propyl, hydroxybutyl but especially hydroxyethyl, the lower alkenyl substituents include such straight and branched-chain monovalent radicals having up to six carbon atoms and having one double bond and include such radicals as allyl, butenyl, and pentenyl; A includes phenyl and the halogeno (especially chloro), lower alkoxy (especially methoxy) and lower alkyl (especially methyl) substituted phenyl radicals, said substituents preferably being located in the para position, but also being located in the ortho and meta positions of the phenyl moiety; lower alkoxy includes those radicals having up to six carbon atoms attached to the remaining portion of the benzazepine molecule through oxygen, and includes such radicals as methoxy, ethoxy, propoxy and the like, alkylene dioxy includes methylene dioxy, ethylene dioxy and propylene dioxy.

The acid addition salts include those prepared from such acids as hydrochloric acid, phosphoric acid, sulfuric acid, maleic acid, citric acid and other well known pharmaceutically acceptable acid addition forming acids. The quaternary salts include those prepared from such organic halides as methyl iodide, ethyl iodide, benzyl chloride and the like.

In general, the 1-phenyl-2,3,4,5-tetrahydro-3,1-benzazepines (I) of this invention are prepared from phenethylaminomethylbenzyl alcohols. These intermediary alcohols are prepared by heating equimolar quantities of a styrene oxide with a phenethylamine. Preferably the heating is effected on a steam bath but the reaction may take place within the temperature range of just above room temperature to about 150° C., the carbinol intermediates then being isolated by the usual techniques such as by distillation and crystallization. In those instances wherein it is desired to have a methyl substituent at the 1-position of the benzazepine (e.g., when $R_1$ of Formula I represents methyl) then an α-methyl styrene oxide is employed, and in those instances wherein it is desired to have a methyl substituent in the 4-position of the benzazepine (e.g. when $R_2$ of Formula I represents methyl) then a branched-chain phenalkyl-amine such as amphetamine may be employed. Of course, in those instances wherein it is desired to have X and Y substituents in the benzenoid moiety of the benzazepine nucleus, the appropriately X, Y-substituted phenalkylamines are employed. It is also apparent to one skilled in the art that 3-substituted benzazepines may be directly formed by employing the appropriately N-substituted phenalkylamines, although in practice it is preferred not to employ such substituted phenalkylamines but rather, it is preferred to N-alkylate the cyclic benzazepine of Formula I wherein R represents hydrogen. The foregoing phenethylaminomethyl benzyl alcohols are transformed into the desired benzazepines (I) by means of an intramolecular cyclization effected by reacting the phenethylaminomethyl benzyl alcohol intermediates (IV) with reagents such as polyphosphoric acid, sulfuric acid, zinc chloride and other similarly acting dehydrating agents. Preferably the intermediate carbinols (IV) are heated with polyphosphoric acid within a temperature range of about 80° C. to 160° C. whereby cyclization occurs, although when using sulfuric acid it is preferred to effect dehydration of about —5° C. to 20° C. The foregoing reactions may be depicted as follows:

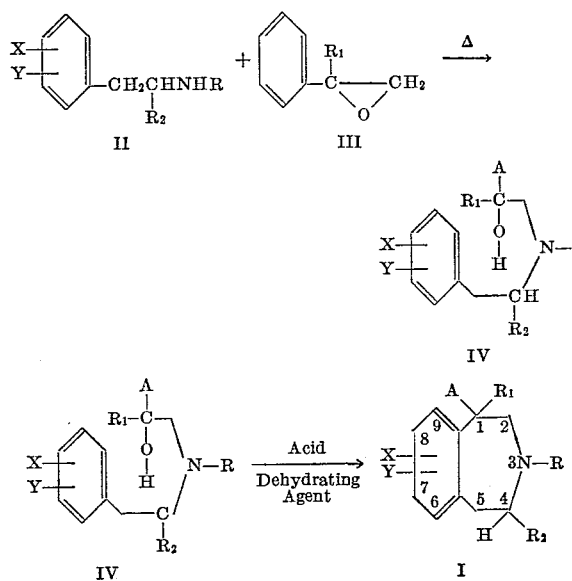

wherein A, X, Y, R, $R_1$ and $R_2$ are as defined in Formula I above.

Alternatively, the desired 1-phenyl-2,3,4,5-benzazepines (I) may be prepared from 1-phenyl-2-oxo-2,3,4,5-tetrahydro-benzazepine intermediates which are obtained by heating the appropriate phenalkylamine (II) with an ester of mandelic acid (e.g., ethyl mandelate) to obtain the appropriate amide (VII). Preferably the heating is effected in an oil bath at about 150°–190° C. for 2–6 hours, although temperatures within the range of about 150°–200° C. may be employed. Preferentially, the foregoing amides (VII) are reacted with an acid dehydrating agent, such as those described above, so as to effect an intramolecular cyclization to form 2-oxo-benzazepine intermediates (VIII). The 2-oxo-benzazepine intermediates are then chemically reduced to the desired benzazepine (IX), according to generally known reduction procedures such as by reaction with lithium aluminum hydride in dioxane. These reactions may be depicted as follows:

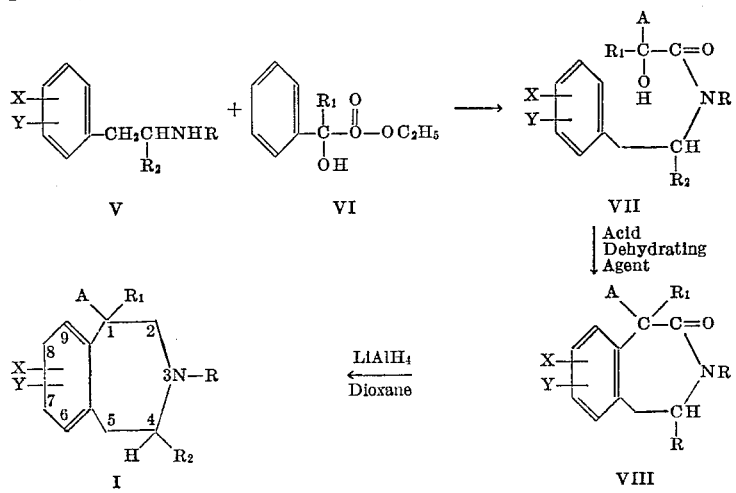

In those instances wherein the above described series of reactions lead to the obtention of 3,1-benzazepines having hydrogen in the 3-position thereof (i.e., when R of Formula I represents hydrogen) such benzazepines may be N-alkylated according to the following reaction scheme:

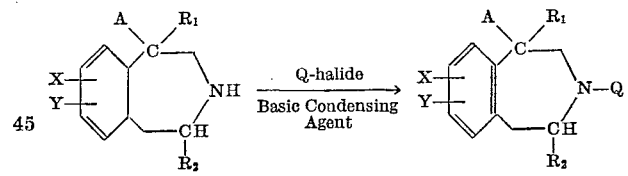

wherein Q represents lower alkyl, hydroxy lower alkyl having 2–6 carbon atoms, lower alkenyl, and benzyl, and X, Y, $R_1$, $R_2$ and $\phi$ are as defined above. The foregoing reaction constitutes the condensation of an organic halide (preferably bromide or chloride) wherein the reaction is effected in an inert solvent such as acetone, preferably at reflux temperature and in the presence of a basic condensing agent such as anhydrous potassium carbonate. Exemplary of such organic halides used are allyl bromide, benzyl bromide and methyl bromide.

The following examples are illustrative of the preparation of the tangible embodiments of this invention. This invention is not limited to such examples, but only by the appended claims and the obvious equivalents thereof taught therein.

EXAMPLE 1

Preparation of 1-phenyl-2,3,4,5-tetrahydro-3,1-benzazepine

Part A.—N-[(β-hydroxy-β-phenyl)-ethyl]-2-phenylethylamine: Heat a well stirred mixture containing 82 g. of styrene oxide and 100 g. of phenethylamine on a steam bath for twelve hours. Distill (in vacuo) the resulting product to obtain the viscous product, which is recrystallized from petroleum ether.

Part B.—1-phenyl-2,3,4,5-tetrahydro-3,1-benzazepine: To 100 ml. of concentrated sulfuric acid (which is kept at 0–5° C. during this addition) add, in small portions, 15 g. of the N-[(β-hydroxy-β-phenyl)-ethyl]-2-phenylethylamine from Part A of this example and stir the resulting mixture for one hour. Pour the resulting mixture onto ice and water, make strongly basic with sodium hydroxide, and extract the desired product with ether. Dry the ether extract over anhydrous potassium carbonate, filter and distill the desired product. The hygroscopic hydrochloride salt prepared with dry hydrogen chloride in ether is crystallized from isopropanol.

Similarly, the amino alcohol (M.P. 95–98° C.) prepared from homoveratryl amine and styrene oxide by the procedure exemplified by Part A of this example is cyclized by the procedure exemplified by Part B of this example to yield 1-phenyl-7,8-dimethoxy-2,3,4,5-tetrahydro-3,1-benzazepine, B.P. 198–200° C./2 mm. which is converted to its acid maleate salt, M.P. 198–200° C.

EXAMPLE 2

4-methyl-1-phenyl-2,3,4,5-tetrahydro-3,1-benzazepine

Part A.—N-[(β-hydroxy-β-phenyl)-ethyl] - 2 - phenylisopropylamine: Heat a well stirred mixture of 82 g. of styrene oxide and 100 g. of d-amphetamine on a steam bath for twelve hours. Distill (in vacuo) the resulting mixture to obtain a viscous product B.P. 160–180° C./1 mm. which is crystallized from petroleum ether M.P. 53–55° C., $[\alpha]_D^{25}$+14.6°, c.=1% in ethanol.

Part B.—4-methyl-1-phenyl-2,3,4,5-tetrahydrobenzazepine: To 100 ml. of concentrated sulfuric acid (kept at 0° C.) slowly, and in small portions, add 15 g. of a finely ground powder of the optically active product of Part A. Stir for one additional hour after which time pour the mixture onto ice and water, make the resulting mixture strongly basic with sodium hydroxide, and extract with ether. Dry the ether extract over anhydrous potassium carbonate, filter and distill to obtain the desired product, B.P. 149–151° C./1 mm. Its hygroscopic hydrochloride salt prepared with dry hydrogen chloride in ether is crystallized from isopropanol and melts at 206–207° C., $[\alpha]_D^{25}$—42.0°, c.=1% in dimethylformamide.

EXAMPLE 3

1-methyl-1-phenyl-2,3,4,5-tetrahydro-3,1-benzazepine

Part A.—α-methyl-α-phenethylaminomethyl benzyl alcohol: Heat a well stirred mixture containing 60 g. of α-methyl styrene oxide and 66 g. of phenethylamine on a steam bath for six hours and distill the resulting reaction mixture. The product, B.P. 160–168° C./1 mm., gives a hydrochloride salt M.P. 142–145° C. from acetonitrile.

Part B.—1-methyl-1 - phenyl - 2,3,4,5 - tetrahydro - 3,1-benzazepine: Condense 28 gms. of α-methyl-α-phenethylaminomethyl benzyl alcohol in 250 ml. of concentrated sulfuric acid and extract the desired product with ether according to the procedure of Part B of Example 2. Dry the ether extract over anhydrous potassium carbonate and distill the product at 150–160° C./1 mm. Recrystallize the product of this example from hexane M.P. 76–79° C. The hydrochloride salt prepared with dry hydrogen chloride in ether melts at 228–229° C.

From the teachings of Examples 1–3 it is obvious that by employing the appropriately substituted reactants, other benzazepines may be similarly prepared. Thus, by changing the reactants and by following substantially the same procedures outlined in Examples 1–3 there may be prepared 1-phenyl-1,4-dimethyl-2,3,4,5-tetrahydro-3,1-benzazepine,
1-phenyl-1,4-dimethyl-7-chloro-2,3,4,5-tetrahydro-3,1-benzazepine,
1-phenyl-1,4,7-trimethyl-2,3,4,5-tetrahydro-3,1-benzazepine,
1-phenyl-4-methyl-8-hydroxy-2,3,4,5-tetrahydro-3,1-benzazepine,
1-phenyl-1,4-dimethyl-8-methoxy-2,3,4,5-tetrahydro-3,1-benzazepine,
1-phenyl-7,8-methylenedioxy-2,3,4,5-tetrahydro-3,1-benzazepine.

The necessary phenethylamine starting materials for the preparation of the foreging benzazepines are either known per se or may be prepared by methods obvious to one of ordinary skill in the art.

EXAMPLE 4

1-phenyl-7-methoxy-2,3,4,5-tetrahydro-3,1-benzazepine

Part A.—N-(β-p-methoxy - phenethyl) - mandelamide: Heat a well stirred solution of 25 g. of β-p-methoxyphenylethyl amine and 30 g. of ethyl mandelate in an oil bath at 180–190° C. for three hours. Cool the reaction mixture and crystallize the desired product from ether M.P. 75–76° C.

Part B.—1-phenyl-2-oxo-7-methoxy-2,3,4,5-tetrahydro-3,1-benzazepine: To 700 g. of polyphosphoric acid, slowly and in small portions, add 20 g. of a finely ground powder of N-(β-p-methoxy-phenethyl)-mandelamide and slowly warm the resulting mixture to 100° C. Continue heating the mixture at 100° C. for one hour. Allow the mixture to come to room temperature, pour the cooled mixture onto ice and water and extract with chloroform. Evaporate off (in vacuo) the chloroform solvent and recrystallize 1 - phenyl-2-oxo-7-methoxy-2,3,4,5-tetrahydro-3,1-benzazepine from ethyl acetate M.P. 169–171° C.

Part C.—1-phenyl-7-methoxy-2,3,4,5 - tetrahydro - 3,1-benzazepine: To a well stirred and refluxing suspension of 5 g. of lithium aluminum hydride in 200 ml. of dioxane, add in a dropwise fashion a solution of 10 g. of 1-phenyl-2-oxo-7-methoxy-2,3,4,5-tetrahydro - 3,1 - benzazepine in 250 ml. of dioxane and heat the resulting reaction mixture at reflux for three hours. Cool the resulting reaction mixture, and while maintaining the mixture at 20° C., (in a dropwise fashion) add 4½ ml. of water, 4½ ml. of 15% sodium hydroxide and 13.5 ml. of water and stir the reaction mixture for one hour. Filter off the precipitate of the inorganic material and distill the resulting filtrate to remove the solvents. Combine the residue with 100 ml. of 5% hydrochloric acid and 200 ml. of ether, stir the mixture until the residue dissolves, separate the aqueous extract, basify the aqueous extract with sodium hydroxide and extract with ether. Dry the ether extract with anhydrous potassium carbonate. Evaporate off the solvent and convert the desired product of this example to its acid maleate salt by adding the product to maleic acid in ethyl acetate to yield 1-phenyl-7-methoxy-2,3,4,5-tetrahydro-3,1-benzazepine maleate, M.P. 196–197° C.

EXAMPLE 5

1-phenyl-3-allyl-2,3,4,5-tetrahydro-3,1-benzazepine

Part A.—With vigorous stirring heat at reflux temperature a mixture containing 6 g. of 1-phenyl-2,3,4,5-tetrahydro-3,1-benzazepine, 2.4 g. of allylbromide, 25 g. of anhydrous potassium carbonate and 250 ml. of anhydrous acetone for fourteen hours. Cool the resulting mixture, filter and distill off the acetone solvent. Dissolve the residue with ether and water, separate the water layer, dry and filter the ether layer and evaporate the ether solvent. Recrystallize the desired product from hexane, M.P. 65–68° C. Prepare 1-phenyl-3-allyl-2,3,4,5-tetrahydro-3,1-benzazepine-hydrochloride M.P. 203–205° C. by treating the product of this example with dry hydrogen chloride in ether.

By substituting the 1 - phenyl-2,3,4,5-tetrahydro-3,1-benzazepine of the above example with 1-phenyl-4-methyl-2,3,4,5-tetrahydro-3,1-benzazepine,
1-phenyl-1,4-dimethyl-2,3,4,5-tetrahydro-3,1-benzazepine,
1-phenyl-1,4-dimethyl-7-chloro-2,3,4,5-tetrahydro-3,1-benzazepine,
1-phenyl-1,4,7-trimethyl-2,3,4,5-tetrahydro-3,1-benzazepine,
1-phenyl-4-methyl-8-ethoxy-2,3,4,5-tetrahydro-3,1-benzazepine, 1-phenyl-1,4-dimethyl-7-methoxy-2,3,4,5-tetrahydro-3,1-benzazepine,
1-phenyl-1-methyl-2,3,4,5-tetrahydro-3,1-benzazepine,
1-phenyl-8-methoxy-2,3,4,5-tetrahydro-3,1-benzazepine,
1-phenyl-7,8-dimethoxy-2,3,4,5-tetrahydro-3,1-benzazepine, and by substantially following the teachings set forth in this example there is produced 1-phenyl-3-allyl-4-methyl-2,3,4,5-tetrahydro-3,1-benzazepine,
1-phenyl-1,4-dimethyl-3-allyl-2,3,4,5-tetrahydro-3,1-benzazepine,
1-phenyl-1,4-dimethyl-3-allyl-7-chloro-2,3,4,5-tetrahydro-3,1-benzazepine,
1-phenyl-1,4,7-trimethyl-3-allyl-2,3,4,5-tetrahydro-3,1-benzazepine,
1-phenyl-3-allyl-4-methyl-8-ethoxy-2,3,4,5-tetrahydro-3,1-benzazepine,
1-phenyl-1,4-dimethyl-3-allyl-7-methoxy-2,3,4,5-tetrahydro-3,1-benzazepine,
1-phenyl-1-methyl-3-allyl-2,3,4,5-tetrahydro-3,1-benzazepine,
1-phenyl-3-allyl-8-methoxy-2,3,4,5-tetrahydro-3,1-benzazepine or
1-phenyl-3-allyl-7,8-dimethoxy-2,3,4,5-tetrahydro-3,1-benzazepine respectively.

Analogously by substituting the allylbromide of this example with other organic halides such as methylbromide, ethylbromide, propylbromide, butylbromide, methallyl bromide, vinylethylbromide and benzylbromide, there is produced 1-phenyl-3-methyl-2,3,4,5-tetrahydro-3,1-benzazepine,
1-phenyl-3-ethyl-2,3,4,5-tetrahydro-3,1-benzazepine,
1-phenyl-3-propyl-2,3,4,5-tetrahydro-3,1-benzazepine,
1-phenyl-3-butyl-2,3,4,5-tetrahydro-3,1-benzazepine,
1-phenyl-3-methallyl-2,3,4,5-tetrahydro-3,1-benzazepine,
1-phenyl-3-vinylethyl-2,3,4,5-tetrahydro-3,1-benzazepine, and
1-phenyl-3-benzyl-2,3,4,5-tetrahydro-3,1-benzazepine respectively.

Similarly the foregoing organic halides may be reacted with 1-phenyl-4-methyl-2,3,4,5-tetrahydro-3,1-benzazepine,
1-phenyl-1,4-dimethyl-2,3,4,5-tetrahydro-3,1-benzazepine,
1-phenyl-1,4-dimethyl-7-chloro-2,3,4,5-tetrahydro-3,1-benzazepine,
1-phenyl-1,4,7-trimethyl-2,3,4,5-tetrahydro-3,1-benzazepine,
1-phenyl-1,4-dimethyl-7-methoxy-2,3,4,5-tetrahydro-3,1-benzazepine,
1-phenyl-1-methyl-2,3,4,5-tetrahydro-3,1-benzazepine,
1-phenyl-8-methoxy-2,3,4,5-tetrahydro-3,1-benzazepine or
1-phenyl-7,8-dimethoxy-2,3,4,5-tetrahydro-3,1-benzazepine according to the procedures of this example to produce the corresponding N-methyl, N-ethyl, N-propyl, N-butyl, N-methallyl, N-vinylethyl and N-benzyl substituted benzazepines.

EXAMPLE 6

1-phenyl-3-β-hydroxyethyl-2,3,4,5-tetrahydro-3,1-benzazepine

To a solution of 6 gm. of 1-phenyl-2,3,4,5-tetrahydro-3,1-benzazepine in 50 ml. of ethanol, add 1 g. of ethylene oxide and keep the stoppered reaction mixture at room temperature for several days. Distill the resulting mixture and crystallize the oil residue from isopropylether, M.P. 95–97° C.

EXAMPLE 7

7,8-dimethoxy-3,3-dimethyl-1-phenyl-2,3,4,5-tetrahydro-3,1-benzazepinium iodide

Heat at reflux temperature a mixture containing 9 g. of 7,8-dimethoxy - 1 - phenyl-2,3,4,5-tetrahydro-3,1-benzazepine, 15 ml. of 37% formaldehyde and 23 ml. of 90% formic acid for 18 hours. Add a solution of 5 ml. of concentrated hydrochloric acid in 10 ml. of water and evaporate the solution to dryness in vacuo on the steam bath. Add a 25 ml. portion of water to the residue and evaporate to dryness. Treat the residue with ether and excess sodium hydroxide solution, separate the ether solution, and dry, filter and evaporate the ether solution. Crystallize 7,8-dimethoxy-3-methyl-1-phenyl-2,3,4-5-tetrahydro-3,1-benzazepine residue from hexane, M.P. 82–84° C. To 5 gms. of 7,8-dimethoxy-3-methyl-1-phenyl-2,3,4,5-tetrahydro-3,1-benzazepine in 5 ml. of ethanol, add 5 ml. of methyl iodide and allow the resulting mixture to stand at room temperature for 15 hours, whereupon the desired 7,8-dimethoxy - 3,3 - dimethyl-1-phenyl-2,3,4,5-tetrahydro-3,1-benzazepinium iodide crystallizes from the mixture, M.P. 246–249° C.

EXAMPLE 8

1-phenyl-7,8-dihydroxy-2,3,4,5-tetrahydro-3,1-benzazepine hydrobromide

Heat, at reflux temperature, under a nitrogen atmosphere, a mixture containing 15 gm. of 1-phenyl-7,8-dimethoxy-2,3,4,5-tetrahydro-3,1-benzazepine and 110 ml. of 48% hydrobromic acid for 2½ hours. On cooling the hydrobromide salt of the desired compound crystallizes. Filter and wash the crystals with alcohol to yield 1-phenyl - 7,8 - dihydroxy-2,3,4,5-tetrahydro - 3,1 - benzazepine hydrobromide, 283–285° C.

It is obvious to one skilled in the art that the compounds of this invention may be produced as racemic mixtures of their dextrorotary and levorotary isomers, whose separation may be effected by the usual well known techniques such as by the fractional crystallization of salts of optically active acids. Additionally, where position 4 is asymmetric, by proper choice of the optically active starting material, optically active products may be obtained directly.

We claim:
1. A member of the group consisting of a 1-phenyl-3,1-benzazepine having the structural formula:

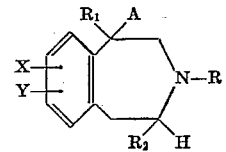

wherein A is a member of the group consisting of phenyl and halogeno-lower alkoxy-and lower alkyl-substituted phenyl, R is a member of the group consisting of hydrogen, lower alkyl, hydroxy lower alkyl having 2–6 carbon atoms, lower alkenyl and benzyl, $R_1$ and $R_2$ are members of the group consisting of hydrogen and methyl and each of X and Y are individually selected from the group consisting of hydrogen, lower alkyl, lower alkoxy, halogen, hydroxy and taken together alkylene dioxy having up to 3 carbon atoms and the non-toxic acid addition and quaternary salts thereof.

2. 1-phenyl-2,3,4,5-tetrahydro-3,1-benzazepine.
3. 1 - phenyl - 7,8 - dimethoxy - 2,3,4,5 - tetrahydro-3,1-benzazepine.
4. 1 - phenyl - 1,4 - dimethyl - 2,3,4,5 - tetrahydro-3,1-benzazepine.
5. 1 - phenyl - 3 - methyl - 2,3,4,5 - tetrahydro - 3,1-benzazepine.
6. 1 - phenyl - 7 - chloro - 2,3,4,5 - tetrahydro - 3,1-benzazepine.

7. 1 - phenyl - 3 - allyl - 2,3,4,5 - tetrahydro - 3,1-benzazepine.

8. A compound of claim 1 wherein A represents phenyl, R represents lower alkyl, X and Y are each lower alkoxy and each of $R_1$ and $R_2$ are hydrogen.

9. A compound of claim 8, wherein each of X and Y are methoxy, A is phenyl, R is methyl, and each of $R_1$ and $R_2$ is hydrogen, said compound being 7,8-dimethoxy-3 - methyl - 1 - phenyl - 2,3,4,5 - tetrahydro - 3,1 - benzazepine.

References Cited

UNITED STATES PATENTS 2,520,264    8/1950    Walter.

ALTON D. ROLLINS, *Primary Examiner.*